(12) United States Patent
Wang et al.

(10) Patent No.: US 7,869,828 B2
(45) Date of Patent: Jan. 11, 2011

(54) ADJUST EQUIPMENT AND METHOD FOR ARRAY ANTENNA TRANSMISSION LINK

(75) Inventors: Wenjie Wang, Guangdong Province (CN); Tiansheng Guo, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 558 days.

(21) Appl. No.: 10/585,014

(22) PCT Filed: Dec. 31, 2003

(86) PCT No.: PCT/CN03/01149

§ 371 (c)(1),
(2), (4) Date: Apr. 17, 2007

(87) PCT Pub. No.: WO2005/067166

PCT Pub. Date: Jul. 21, 2005

(65) Prior Publication Data

US 2008/0261534 A1    Oct. 23, 2008

(51) Int. Cl.
*H04M 1/00* (2006.01)
*H04B 17/00* (2006.01)

(52) U.S. Cl. .................. 455/561; 455/67.11; 455/115.1; 455/120

(58) Field of Classification Search .................. 455/561, 455/562.1, 67.11, 115.1, 126, 423
See application file for complete search history.

(56) References Cited

U.S. PATENT DOCUMENTS

| | | | | |
|---|---|---|---|---|
| 4,488,155 A | | 12/1984 | Wu | |
| 5,675,285 A | * | 10/1997 | Winters | 330/124 R |
| 5,894,598 A | * | 4/1999 | Shoki | 455/562.1 |
| 5,936,754 A | * | 8/1999 | Ariyavisitakul et al. | 398/28 |
| 6,006,111 A | * | 12/1999 | Rowland | 455/561 |
| 6,133,868 A | * | 10/2000 | Butler et al. | 342/174 |

(Continued)

FOREIGN PATENT DOCUMENTS

CN    01112987.5    4/2004

(Continued)

OTHER PUBLICATIONS

International Search Report for International Publication No. PCT/CN03/01149 dated Oct. 28, 2004.

*Primary Examiner*—Duc M Nguyen
(74) *Attorney, Agent, or Firm*—Hamre, Schumann, Mueller & Larson, P.C.

(57) ABSTRACT

Adjust equipment and method for array antenna transmitting link, include: power detect device, signal synthesize device and array adjust device; the downlink signal of the transmitting link processed by the power detect device and be transmitted to the power detect signal feed device, and then transmitted to the signal synthesize device; signal synthesize device depart the part of radio frequency signal, output to the power detect device for the power detect; output the power signal to the power detect signal feed device, add the power signal and high frequency signal, power detect signal depart device pick the power signal from the mixed signal, regulate the weight of the adjustment. This invention never use the special adjust signal transmitting device and becoming antenna, placed by using method of signal power detect to calculate the adjust weight value and transmitting phase adjust weight value of the transmit gain, the speed of the constringency become faster.

23 Claims, 8 Drawing Sheets

U.S. PATENT DOCUMENTS

| | | | |
|---|---|---|---|
| 6,157,340 A | 12/2000 | Xu et al. | |
| 6,157,343 A * | 12/2000 | Andersson et al. | 342/371 |
| 6,236,839 B1 | 5/2001 | Gu et al. | |
| 6,515,616 B1 * | 2/2003 | Kuplicki | 342/174 |
| 6,600,445 B2 | 7/2003 | Li | |
| 6,615,024 B1 | 9/2003 | Boros et al. | |
| 6,647,276 B1 * | 11/2003 | Kuwahara et al. | 455/562.1 |
| 6,704,579 B2 * | 3/2004 | Woodhead et al. | 455/522 |
| 6,806,844 B2 * | 10/2004 | Azuma | 343/853 |
| 6,934,541 B2 * | 8/2005 | Miyatani | 455/423 |
| 7,043,271 B1 | 5/2006 | Seto et al. | 455/562.1 |
| 7,151,951 B2 * | 12/2006 | Goransson et al. | 455/562.1 |
| 7,340,248 B2 * | 3/2008 | Kawasaki et al. | 455/423 |
| 7,496,384 B2 * | 2/2009 | Seto et al. | 455/562.1 |
| 2001/0016505 A1 * | 8/2001 | Rexberg et al. | 455/562 |
| 2005/0239419 A1 * | 10/2005 | Fudaba et al. | 455/101 |

FOREIGN PATENT DOCUMENTS

| | | |
|---|---|---|
| CN | 01800020.7 | 4/2004 |
| CN | 01122536.X | 9/2004 |
| CN | 00815528.3 | 3/2005 |
| CN | 03102791.1 | 6/2005 |
| CN | 01809947.5 | 7/2005 |
| CN | 02142694.5 | 1/2006 |
| JP | 2002 290315 | 8/2002 |
| JP | 2003 152611 | 5/2003 |
| WO | WO 02/061970 | 8/2002 |

* cited by examiner

ADJUST EQUIPMENT AND METHOD FOR ARRAY ANTENNA TRANSMISSION LINK

FIELD OF THE INVENTION

The present invention relates to the technology for calibrating the array antenna in the field of wireless communication technology, and more specifically, relates to a method and apparatus for calibrating the transmit link of array antenna.

BACKGROUND OF THE INVENTION

In the cellular wireless communication system, with the increasing of the number of user, the jamming of the frequency spectrum and the distortion from the same channel become worse. To solve such problems, it is desired to improve the quality of cellular wireless communication system, to increase the coverage area of base station, and to increase the capacity of system by using smart antenna technology and array signal processing technology.

For a base station in the wireless communication network, there are signals coming from the mobile terminals in local cell as well as the signal with same frequency coming from the mobile terminals in other cell inside the received uplink signal. The more the cell of wireless communication network, the worse the same frequency distortion, thereby same frequency distortion will directly affect the receiving effect of base station and mobile terminals, inducing the reduce of base station's effective cover radius and degrading the quality of communication. To solve the problem of same frequency distortion, the base station need to selectively receive the uplink signal for depressing the distortion and to realize the directionally transmitting of the downlink signal, that is, it should direct the main lobe of downlink beam to the desired user, but form the zone point or side lobe of beam with lower power at the direction of other users. In this way, it can reduce the same channel distortion between cells, increase the coverage of cell and improve the quality of communication.

It can adopt the conventional beam forming technology to realize the directionally receiving and transmitting, such as adaptive beam forming technology. When adopting the adaptive beam forming technology, the main lobe of the beam can be directed to the desired user all along, and it can follow the movement of the user. In time division duplex (TDD) mode, the propagation paths of uplink and downlink signals are symmetry, that is, the propagation paths of uplink and downlink signals are same, but the propagation directions are opposite, so that the beam weight calculated through adaptive algorithm can be directly used for downlink direction, and realize directional transmission. But, there are altitude and phase errors between the receiving channel and transmission link, the directional accuracy will be affected by the directly usage of uplink beam weight, so it is need to calibrate the uplink, downlink channel and feeder cable to compensate the altitude and phase errors. In the frequency division duplex (FDD) mode, due to the frequency points of uplink and downlink are different, so that the channel of uplink and downlink are different, then the uplink weight can be directly applied for downlink. But the directions of arrival (DOA) can be estimated by the uplink, DOA information can be used to downlink directional transmission, but it is need to form the beam with given direction, as well as to calibrate the transmission link and feeder cable.

Beside adaptive beam forming method, the fixed multi-beam method which is relatively simply can be used to realize the directional receiving and transmission. The forming of fixed multi-beam is to use several fixed directional uplink beams and downlink beams to cover the receiving and transmission of the whole sector. The beam weight to form the fixed multi-beam can be determined by simulation method, but it can not determine the altitude and phase specialty of uplink and downlink channel in actual system during the simulation, so it can only assume the altitude and phase specialty of uplink and downlink channel are same, and it is similar to adaptive beam forming method, it must calibrate the transmission link and feeder cable to correctly form the downlink beam.

In wireless communication system, the common downlink channel is transmitted by broadcast. If it adopts the digital beam forming, a set of omni-beam weight can be gotten from simulation calculation and can be omni-broadcasted to cover the sector, otherwise, it can get a wide beam weight through calculation and can be broadcasted to cover the downlink sector. If Butler matrix is used to form the beam, it is needed to calculate or measure the equivalent beam weight in before, then to form the beam secondly in base band to solve the transmission problem of downlink common channel. In the same way, it must calibrate the transmission link and feeder cable to correctly form the wide beam which is formed using the above method.

There are many methods about the calibrating of array antenna and transmission link, hereinafter are several conventional method:

(1) In U.S. Pat. No. 4,448,155 for "Method and apparatus for self-calibration and phasing of array antenna" and China Patent No. 01800020.7 for "Apparatus for array antenna wireless communication and method for calibration", a kind of methods for calibrating the array antenna and transmission link is set forth, this method is to measure the gain and phase of each transmission link using instrument at the project field, then to calibrate the array using the measured result. The most disadvantage of this method is that it uses the off-line calibrating manner, and it can not calibrate the time-varied array error. It is not benefit to the engineering usage and maintenance, particularly, it is not suitable for the running communication system.

(2) In U.S. Pat. No. 6,615,024 for "Method and apparatus for determining signatures for calibrating a communication station having an antenna array", China Patent No. 00815528.3 for "Method and apparatus for calibrating smart antenna array" and China Patent No. 02142694.5 for "Method and apparatus for calibrating antenna array", a kind of methods to calibrate the array antenna is set forth. In these technical schemes, a beacon antenna and corresponding transceiver of calibrating signal need to be placed in the far field area and near field area of antenna array. During the calibration of uplink, the calibration signal is transmitted by beacon antenna and it is received by base station; during the calibration of downlink, the calibration signal is transmitted by base station and it is received by beacon signal, then the calibration weight is calculated out for the uplink and downlink of base station. The advantage of this calibration method is that the uniformities of the altitude and phase of the whole transmitting and receiving link can be calibrated, but due to the need of equipments such as transceiver of calibrating signal, beacon antenna, etc., so it increases the complexity and cost to realize the base station. Further, more significant multi-path effect will be induced when beacon antenna is placed in the far field area, and the calibrating signal is not planar wave when reaching antenna array in the case that beacon antenna is placed in the near field area, so it causes the calculation of calibrating weight is very complicated.

(3) In U.S. Pat. No. 6,600,445 for "Method and device for calibrating smart antenna array", U.S. Pat. No. 6,236,839 for "Method and apparatus for calibrating a smart antenna array", U.S. Pat. No. 6,157,340 for "Adaptive antenna array subsystem calibration", China Patent No. 01112987.5 for "Method and apparatus for calibrating smart antenna channel array", China Patent No. 01122536.X for "A close-loop calibrated dipolar smart antenna array system", China Patent No. 01809947.5 for "Calibrating system of array antenna receiving apparatus", and China Patent No. 03102791.1 for "Apparatus for calibrating array antenna and method for calibrating array antenna", a kind of methods for calibrating array antenna is set forth in each of them. In this kind of methods, it is considered that the non-uniform error of the gain and phase for each antenna unit and corresponding antenna feeder cable is not time-varied, firstly, the gain and phase for this part is measured using instrument and the measured results are saved, then a coupler and the calibration transceiver coupled to this coupler are designed for the RF (radio frequency) terminal of each link, the calibration method is similar to that of (2), due to the calibration weight got from calculation is not the calibration weight for the whole link, so it need to be modified by the measured result. Compared with the methods in (2), the advantage of this kind of method is not using beacon antenna and corresponding antenna feeder cable, but it still need the transceiver of calibrating signal, it need to measure the altitude and phase specialty of antenna unit and antenna feeder cable, it causes the complicated calibration equipment and high cost.

SUMMARY OF THE INVENTION

The technical problems which will be solved through the present invention is to overcome the shortages of prior array calibration art, including that the calibration equipment is complex, special transceiver equipment of calibration signal is needed, the altitude and phase specialties of antenna feeder cable need to be measured and it is difficult to be realized in engineering, etc. It is realized by providing a method and apparatus for calibrating the array antenna transmission link, and it can simplify the complication of the system and reduce the difficulty to realize it.

In the calibration equipment of array antenna transmission link described in present invention, the array antenna transmission link includes array transmitter, n of power amplifiers, n of uplink and downlink signal separating apparatuses, and n of antenna units. Array transmitter, n of power amplifiers and n of uplink and downlink signal separating apparatuses are placed in base station, the output of base band signal processing module is inputted into array transmitter, n channels of signal are transmitted by the array transmitter, after going through power amplifier and uplink and downlink signals separating apparatus, they are transmitted through the antenna.

The calibration equipment includes power detecting signal separating apparatus, power detecting signal feeder apparatus, power detecting apparatus, signal synthesizing apparatus and array calibration apparatus;

The power detecting signal separating apparatus, receives the signal from the separating apparatus of uplink and downlink signals, filters out the DC signal from the RF signal, and transmits the RF signal of high frequency to the power detecting signal feeder apparatus; at the same time, recovers the power signal from the signal transmitted by the power detecting signal feeder apparatus, does the adjust of calibration weight, and transmits the calibration weight after adjustment to the array calibration apparatus;

The power detecting signal feeder apparatus, on one side, transmits the high frequency RF signal outputted by power detecting signal separating apparatus, on the other side, mixes the power signal outputted by power detecting apparatus and high frequency RF signal, and transmits the mixed signal to the power detecting signal separating apparatus;

The power detecting apparatus, is used to detect the power of RF signal coming from the signal synthesizing apparatus, and outputs the power signal to the power detecting signal feeder apparatus;

The signal synthesizing apparatus is coupled with n of antenna units, used to synthesize RF signal and output to the power detecting apparatus;

The array calibration apparatus, placed between the base band signal processing module and array transmitter, is used to calibrate the array antenna transmission link according to the adjusted calibration weight.

In the calibration apparatus in present invention, the signal synthesizing apparatus, power detecting apparatus and power detecting signal feeder apparatus can constitute an outdoor unit with n of antenna unit, connected to a base station via a set of RF cable.

The calibration method of the present invention, comprises below steps: First, get the initial values of gain calibration weight and phase calibration weight of transmission link; then calculate the gain calibration weight and phase calibration weight of transmission link; calibrate the gain and phase of array transmission link using the above calculated calibration weights.

Comparing the apparatus and method of the present invention with prior array calibration art, it doesn't use the calibration transceiver apparatus and beacon antenna dedicated for the calibration of array antenna, but use the method of signal power detecting to calculate the gain calibration weight and transmission phase calibration weight, so the algorithm is simple, the speed of convergence is fast, and the accuracy of convergence is fine. Additionally, it does not need the dedicated calibration signal inducing system during the calibration, and not affect the normal communication of the system. At the same time, the present invention reduces the complication of the system significantly, it is easy to be used in the engineering.

DETAILED DESCRIPTION OF THE PREFERRED EMBODIMENT

The technical scheme of the present invention will now be described in detail with reference to the accompanying drawings and preferred embodiments.

The key point of the technical scheme of the present invention is to calculate the calibration weight of transmission link through detecting the transmission signal power value, then to realize the calibration for the transmission link of array antenna.

Figure 1:
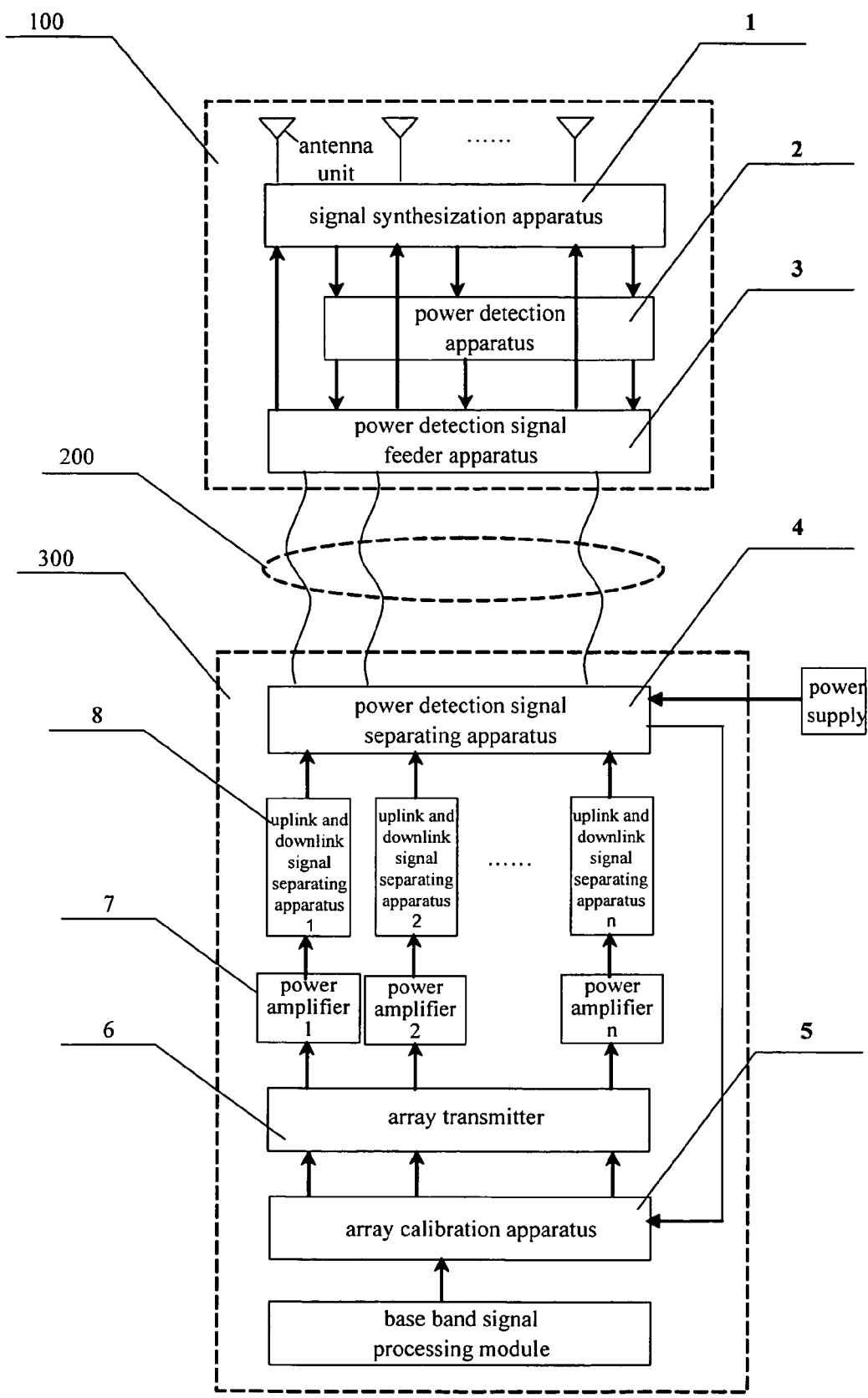
FIG. 1 is the structure diagram of the calibration apparatus according to the present invention.

As illustrated in FIG. 1, the calibration apparatus provided in present invention includes signal synthesizing apparatus 1, signal power detecting apparatus 2, and power detecting signal feeder apparatus 3 in outdoor unit 100, as well as the power detecting signal separating apparatus 4 and array calibration apparatus 5 placed inside base station 300, outdoor unit communicates with base station 300 via RF cable 200. While array antenna transmission link is generally comprised of base band signal processing module, array transmitter 6, n of power amplifiers 7, n of uplink and downlink signal separating apparatuses 8 and n of antenna units, besides antenna unit is placed in outdoor unit 100, all of the other apparatuses are placed inside base station 300.

During the calibration for the transmission link of array antenna, downlink signal in one or plural channel will be transmitted by the array transmitter 6, be amplified by the power amplifiers of respective links, then reaches the power detecting signal separating apparatus 4 via uplink and downlink signal separating apparatus 8. In power detecting signal separating apparatus 4, DC signal is filtered out from RF signal, the high frequency RF signal can directly pass through, and will be transmitted to the power detecting signal feeder apparatus 3 in outdoor unit 100 via RF cable 200. High frequency RF signal reaches signal synthesizing apparatus 1 via power detecting signal feeder apparatus 3, one part of RF signal will be separated at signal synthesizing apparatus 1, the remaining RF signal will be transmitted out via n of antenna units. The separated RF signal will be sent to power detecting apparatus 2 for power detecting, then be outputted the power signal to power detecting signal feeder apparatus 3 via power detecting apparatus 2. Power signal will be mixed with high frequency RF signal by power detecting signal feeder apparatus 3, and the mixed signal will be transmitted to power detecting signal separating apparatus 4 via RF cable 200. Then the power signal will be recovered from mixed signal by power detecting power separating apparatus 4, and the calibration weight will be adjusted, then send the adjusted calibration weight to array calibration apparatus 5. Array calibration apparatus 5 is placed between base band signal processing module and array transmitter 6, after receiving the adjusted calibration weight, it will calibrate the transmission link of array antenna, control the output of array transmitter 6.

Figure 2:
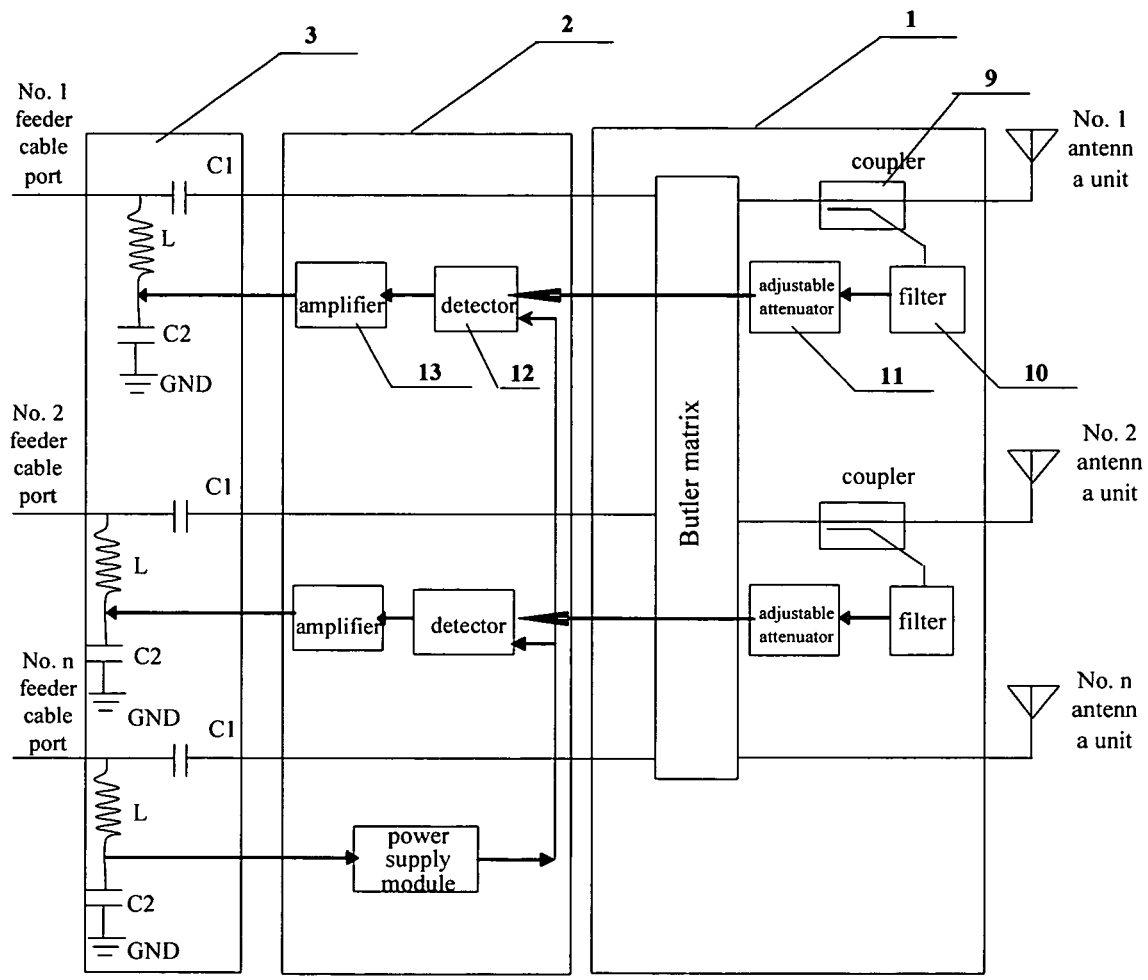
FIG. 2 is the diagram of signal synthesizing apparatus 1, power detecting apparatus 2 and power detecting signal feeder apparatus 3 according to the first embodiment.

FIG. 2 gives out one embodiment of signal synthesizing apparatus 1, power detecting apparatus 2 and power detecting signal feeder apparatus 3, which is suitable for the case that the downlink (RF) beam of base station is formed using Butler matrix.

In present embodiment, signal synthesizing apparatus 1 includes Bulter matrix, (n−1) of couplers 9, (n−1) of filters 10 and (n−1) of adjustable attenuators 11, wherein coupler 9, filter 10 and adjustable attenuator 11 will be provided in the first (n−1) of transmission links. High frequency RF signal will directly reaches signal synthesizing apparatus 1 from power detecting signal feeder apparatus 3, and forms RF beam in signal synthesizing apparatus 1, a small part of RF signal will be separated from each of RF signal by coupler 9 after the forming of beam, When separating the RF signal, the attenuation of source RF signal should not exceed 1 dB, for example, it can choose the power of separated RF signal is 1/1000 of the power of source signal. The remaining RF signal will be transmitted out via antenna units. The separated RF signal will be filtered by filter 10 and attenuated by adjustable attenuator 11, then sent to signal power detecting apparatus 2.

Due to the downlink beam forming link of Bulter matrix can be equaled to a network comprised of one power separator and some phase shifters, when there is only one transmission link transmits signal, there are output signal coming from each port between Bulter matrix and each of the antenna units, and the signal power outputted from each port are same, only the signal phases are different, it can be equaled to a power divider; when all of the downlink link transmit signal, there are output signal coming from each port between Bulter matrix and each of antenna unit, taking the signal from any one of the output port, its specialty is the synthesizing of the signal transmitted by all of the downlink transmission link, it equals to a signal synthesizer. Thereby during the calibration of transmission link, it can directly use the signal synthesizing and signal power dividing specialty of Bulter matrix, it does not need dedicated signal synthesizer, the signal synthesizing is finished in the main link. To avoid affecting the receiving and transmitting of high frequency RF signal, a part of signal will be coupled by coupler 9 for the power detecting before power detecting.

Signal power detecting apparatus includes (n−1) of detectors 12 and (n−1) of amplifiers 13, corresponding to first transmission link to (n−1)$^{th}$ transmission link, nth transmission link is only used for transmitting power signal, to supply power to outdoor unit. The signal outputted by signal synthesizing apparatus 1 will form power signal after detecting and amplifying processing, it is outputted to power detecting signal feeder apparatus 3. Due to that the Bulter matrix is used as signal synthesizing apparatus, when only nth transmission link transmits signal, the signal power can be detected from other antenna unit output ports of Bulter matrix, so apparatuses such as detector, amplifier and etc. of this transmission link can be omitted.

Power detecting signal feeder apparatus 3 includes n of signal feeder units, corresponding to n of transmission links, respectively. Each of signal feeder units includes: inductive circuit L, capacity circuit C1 and capacity circuit C2. For the signal feeder unit of the first transmission link to the (n−1)$^{th}$ transmission link, wherein inductive circuit L is used to mix the low frequency signal of power signal outputted by signal power detecting apparatus 2 with the high frequency RF signal, capacity circuit C2 is used to filter the high frequency part of power signal, capacity circuit C1 is used to prevent sending the low frequency signal of power detecting signal to antenna units; while the inductive circuit L in the n$^{th}$ transmission link is used to separate the power supply signal from the high frequency RF signal, capacity circuit C2 is used to filter the high frequency part of power supply signal, capacity circuit C1 is used to prevent sending the power supply signal to antenna units. The low frequency signal of first (n−1) channels is mixed with high frequency RF signal through inductive circuit L and capacity circuit C2, the mixed signal after the mixing will be transmitted to power detecting signal separating apparatus 4 via corresponding RF cable 200.

Figure 3:
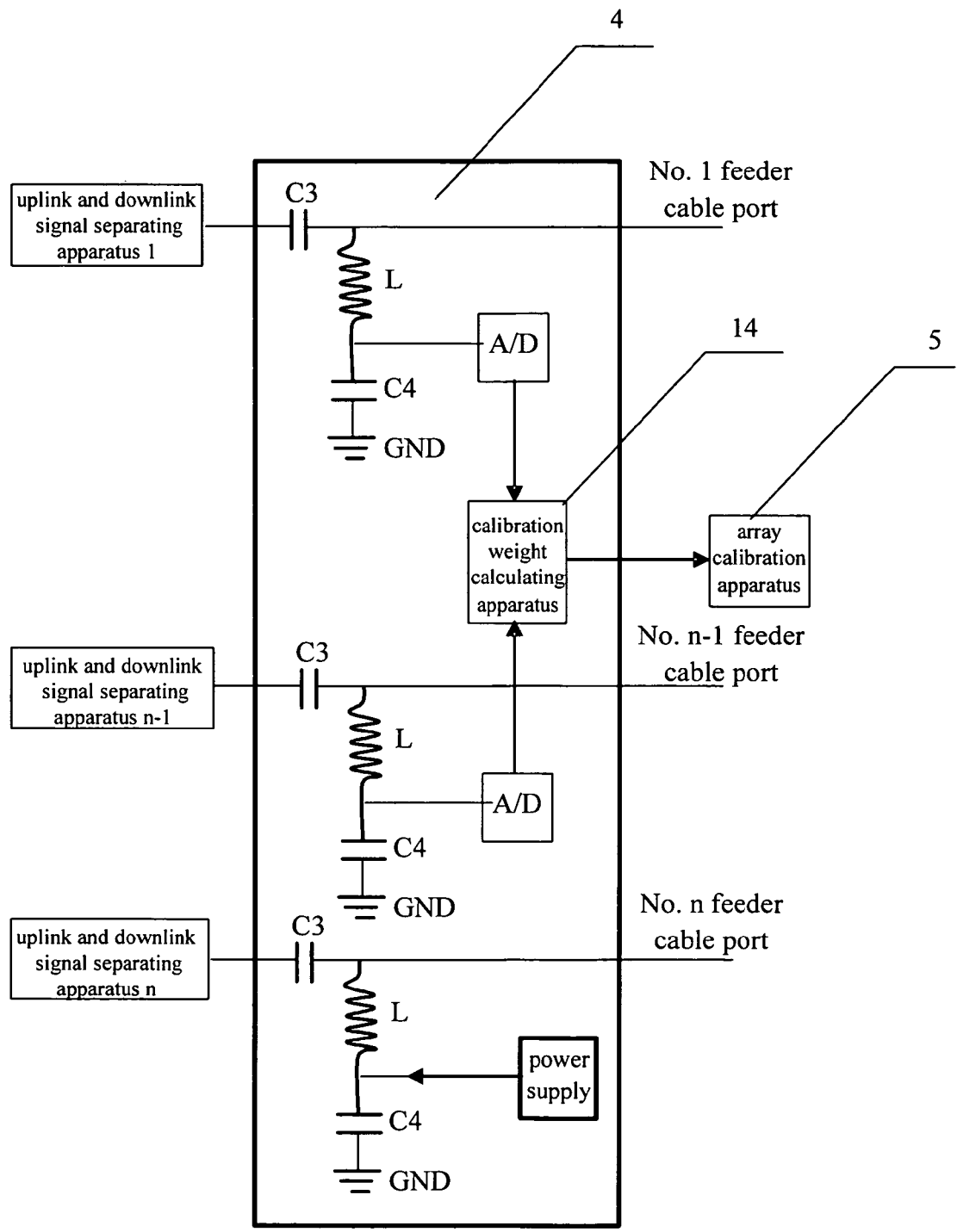
FIG. 3 is the diagram of power detecting signal separating apparatus 4 according to the first embodiment.

As shown in FIG. 3, power detecting signal separating apparatus includes: n of inductive circuits L, n of capacity circuits C3, n of capacity circuits C4, (n−1) of A/D converters and calibration weight calculating apparatus 14, wherein the $n^{th}$ transmission link does not have A/D converter. For the first to the $(n-1)^{th}$ transmission link, inductive circuit L is used to separate the power signal from mixed signal, capacity circuit C4 is used to filter the high frequency part of power signal, capacity circuit C3 is used to prevent sending the power signal to uplink and downlink signal separating apparatus 8 of corresponding transmission link; while for the $n^{th}$ transmission link, inductive circuit L is used to mix the power supply signal with the high frequency RF signal, capacity circuit C4 is used to filter the high frequency part of power supply signal, capacity circuit C3 is used to prevent sending power supply signal to the $n^{th}$ uplink and downlink signal separating apparatus 8. After inputting the mixed signal, low frequency power signal is recovered through inductive circuit L and capacity circuit C4 of the first to the $n^{th}$ transmission link, and filter power signal from mixed signal through capacity circuit C3. Then the low frequency power signal will perform the A/D converting through A/D converter, the converted power signal is transmitted to calibration weight calculating apparatus 14, calibration weight calculating apparatus 14 will adjust the calibration weight according to the value of received power signal. The adjusted calibration weight will be transmitted to array calibration apparatus 5, to calibrate each of the transmission links.

Through the apparatuses shown in FIGS. 2 and 3, the transmission links of array antenna can be adjusted continuously, until the transmission links meet the target of uniformity.

Figure 4:
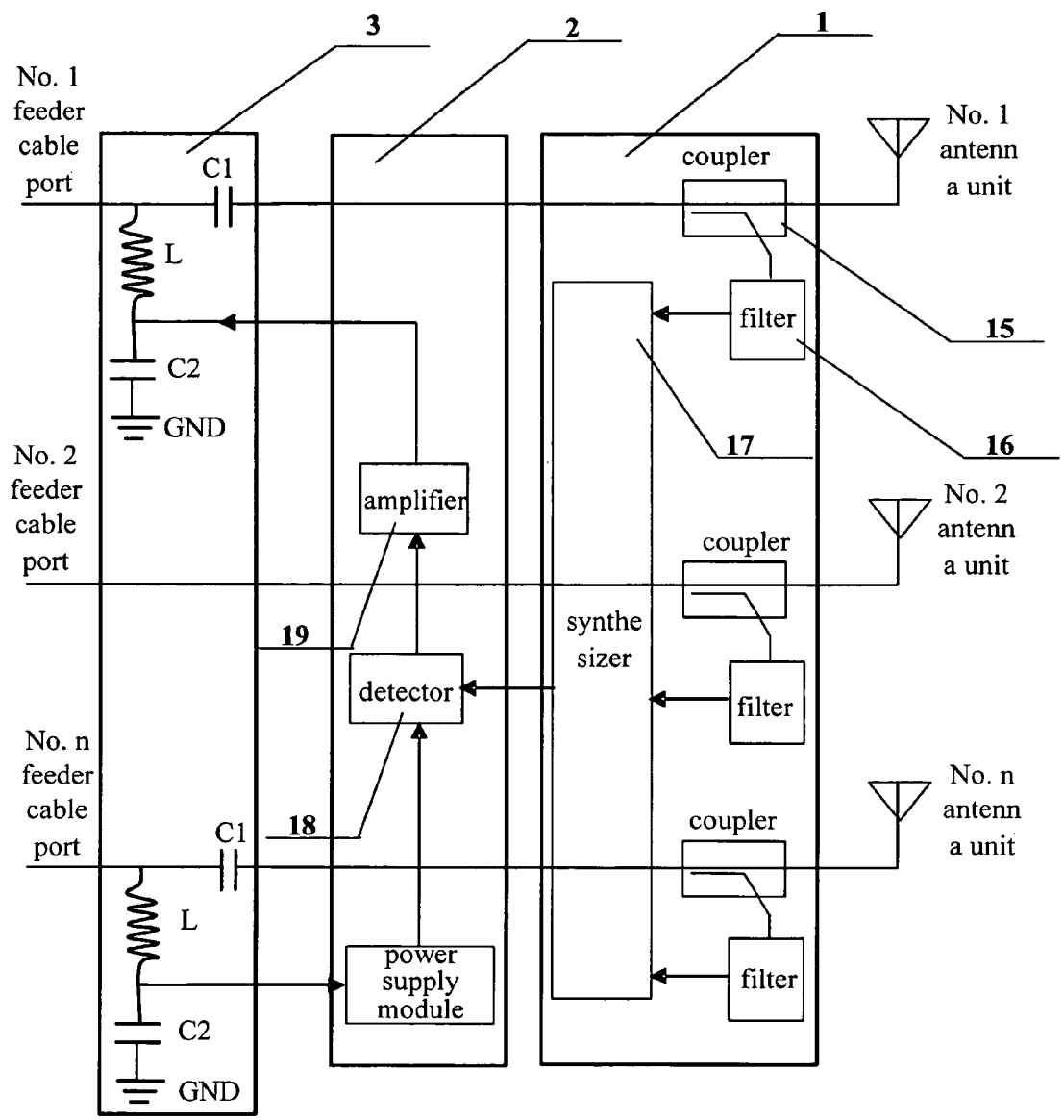
FIG. 4 is the diagram of signal synthesizing apparatus 1, power detecting apparatus 2 and power detecting signal feeder apparatus 3 according to the second embodiment.

FIG. 4 gives out another embodiment of signal synthesizing apparatus 1, power detecting apparatus 2 and power detecting signal feeder apparatus 3, which is suitable for the case of forming the downlink beam in the base band at the base station.

In this embodiment, signal synthesizing apparatus 1 is comprised of n of couplers 15, n of filters 16 and one signal synthesizer 17 with n channels. High frequency RF signal directly reaches signal synthesizing apparatus 1 after passing power detecting signal feeder apparatus 3. A small part of RF signal is separated by coupler 15 for each channel of RF signal, the remaining of RF signal will be transmitted out via n of antenna units. The separated RF signal is sent to synthesizer 17 after the processing of filter 16, then the RF signal after synthesizing will be outputted to power detecting apparatus 2.

Power detecting apparatus is comprised of detector 18 and amplifier 19. Synthesized RF signal will form power signal through the processing of detector 18 and amplifier 19, and be sent to power detecting signal feeder apparatus 3.

Power detecting signal feeder apparatus 3 includes: inductive circuit L, capacity circuit C1 and capacity circuit C2 in the first transmission link and the $n^{th}$ transmission link, wherein the inductive circuit L of the first transmission link is used to mix the low frequency signal of power signal with high frequency RF signal, capacity circuit C2 is used to filter the high frequency part of power signal, capacity circuit C1 is used to prevent sending the low frequency signal in power signal to antenna units; the inductive circuit L of the $n^{th}$ transmission link is used to separate the power supply signal from high frequency RF signal, capacity circuit C2 is used to filter the high frequency part of power supply signal, capacity circuit C1 is used to prevent sending the power supply signal to antenna units. Power signal is filtered by the capacity circuit C2 of the first transmission link and mixed with high frequency RF signal of first transmission link through inductive circuit L. Due to there is only one channel of power signal, in fact this channel of power signal can be mixed with any one of high frequency signal and transmitted to base station, it only need to provides inductive circuit L, capacity circuit C1 and capacity circuit C2 in the corresponding link. In this embodiment, the high frequency signal of first transmission link is chosen for mixing.

The mixed signal after mixing is transmitted to the power detecting signal separating apparatus 4 via corresponding RF cable 200.

Figure 5:
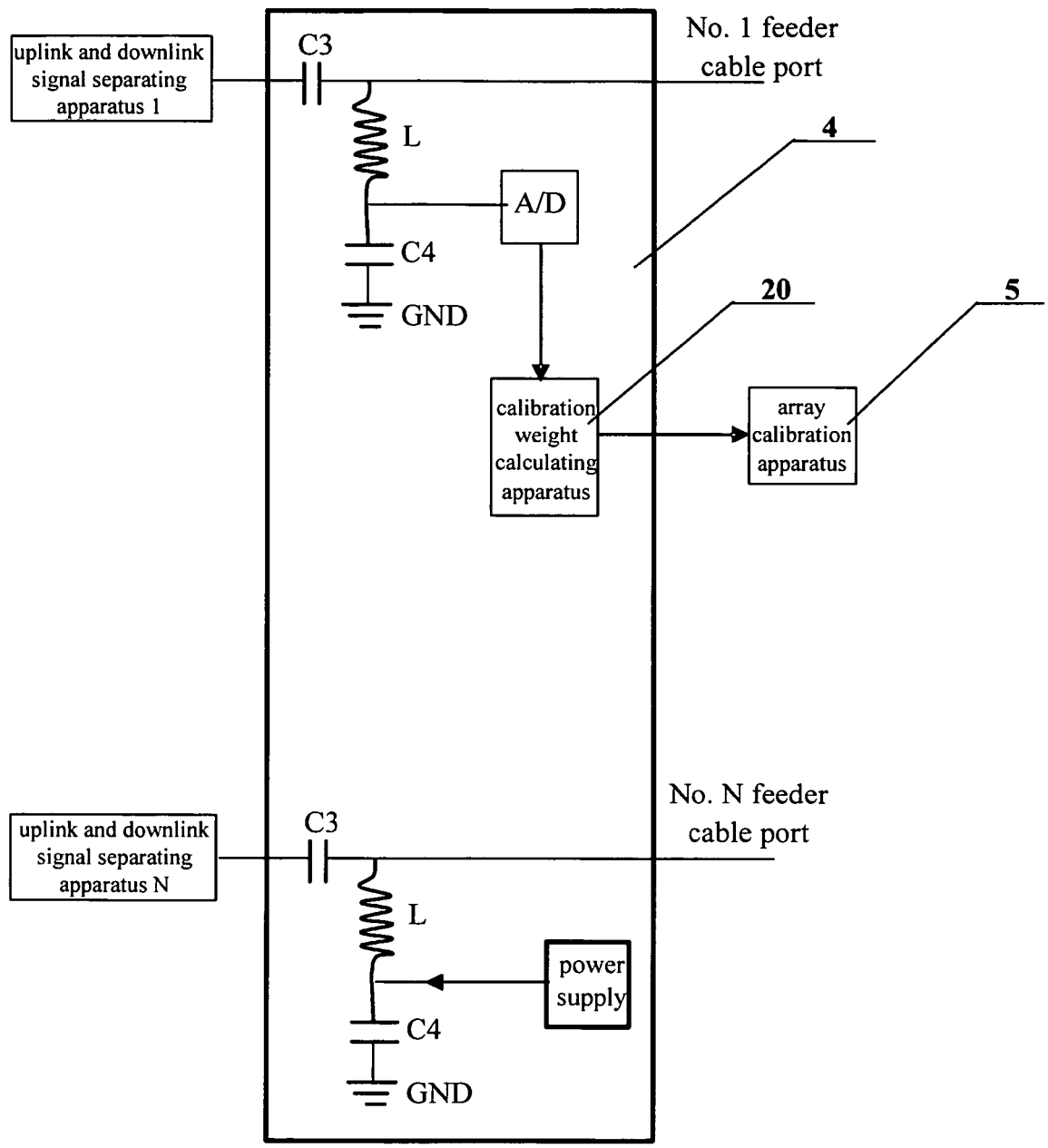
FIG. 5 is the diagram of power detecting signal separating apparatus 4 according to the second embodiment.

As shown in FIG. 5, power detecting signal separating apparatus 4 includes: inductive circuit L in the first transmission link and the $n^{th}$ transmission link, capacity circuit C3 and capacity circuit C4, as well as A/D converter and calibration weight calculation apparatus 20; wherein inductive circuit L of first transmission link is used to separate the power signal from the mixed signal, capacity circuit C4 is used to filter the high frequency part of power signal, capacity circuit C3 is used to prevent sending the power signal to first uplink and downlink signal separating apparatus 8; inductive circuit L of the $n^{th}$ transmission link is used to mix the power supply signal with high frequency RF signal, capacity circuit C4 is used to filter the high frequency part of power supply signal, capacity circuit C3 is used to prevent sending the power supply signal to the $n^{th}$ uplink and downlink signal separating apparatus 8. In the power detecting signal separating apparatus 4, firstly, low frequency power signal will be recovered from mixed signal through inductive circuit L and capacity circuit C4 in first transmission link, and filter the power signal form the mixed signal through capacity circuit C3, then the low frequency power signal is outputted to A/D converter for A/D converting, the signal after A/D converting is transmitted to calibration weight calculation apparatus 20. Calibration weight calculation apparatus 20 will adjust the calibration weight according to the value of power signal, and transmit the adjusted calibration weight to array calibration apparatus 5 for calibrating each of the transmission links.

Through the apparatus shown in FIGS. 4 and 5, the transmission link of array antenna can be adjusted continuously, until the transmission links meet the need of uniformity.

In the present invention, certain energy of downlink signal is coupled from each of the antenna unit (or from each of the antenna ports of base station) through signal synthesizing apparatus 1, then transmit the coupled downlink signal to signal power detecting apparatus 2 for signal power detecting, so the present invention does not need the out field beacon antenna to measure the synthesized signal power.

The calibration method provided by the present invention for the transmission link of array antenna includes below steps: firstly, get the initial value of gain calibration weight and the initial value of phase calibration weight for the transmission link; then calculate the gain calibration weight and phase calibration weight for transmission link; calibrate the gain and phase for array transmission link using above calculated calibration weight. Hereinafter, each steps of the present invention will be described in detail.

The calculation of initial value of calibration weight can be finished before the running of the base station.

Control the base band signal and make the base station only having one channel sending signal, adjust the gain calibration weight for this link, and make the transmitting power of this link meet the rating value, then the gain calibration weight at this time is the initial value of the gain calibration weight for this link. To perform the above operation for all of the transmission links in the base station, to get the initial value of gain calibration weight for each transmission link.

There is some little difference in getting the initial value of phase calibration weight for transmission link according to the downlink beam forming manner.

For the first embodiment using Bulter matrix to realize the downlink beam forming, firstly, control all of the transmission link to send signal with same phase in base band, then select the first transmission link as the reference channel, the other channel as the channel to be calibrated, adjust the phase of transmitting signal for the calibrating channel, make the signal power of first antenna unit is at maximum, and the signal powers of other antenna unit are at minimum, save the phase adjusting coefficient of transmission link at this time, which is represented by vector $\lfloor 0\ \phi_{adj1} \ldots \phi_{adjn} \rfloor$, then calculate the inverse matrix $W_{but}^{H}$, or $W_{but}^{-1}$ of the equivalent transmission coefficient matrix of Bulter matrix, and choose the first line vector of the above inverse matrix, which is respected by $V_{bulter,1} = \lfloor \phi_{1,1}\ \phi_{1,2} \ldots \phi_{1,n} \rfloor$, then the initial value of phase calibration weight for transmission link is $$\left[ \begin{array}{cccc} \frac{0}{\phi_{1,1}} & \frac{\phi_{adj2}}{\phi_{1,2}} & \ldots & \frac{\phi_{adjn}}{\phi_{1,n}} \end{array} \right].$$

For the second embodiment which is forming the downlink beam at base band, firstly, choose a transmission link as reference channel, the other transmission links as reference channels, control the reference channel and one of the channel to be calibrated to sending signal simultaneously, adjust the phase of base band signal in the channel to be calibrated, make the power of synthesized signal of the signals transmitted by the two channel at minimum, then the conjugate of the phase adjusting coefficient for the channel to be calibrated is the initial value of phase calibration weight for this channel; if the power of synthesized signal is at maximum, then the phase adjusting coefficient for the channel to be calibrated is the initial value of phase calibration weight for this channel. Choose another channel to be calibrated, repeat the depicted operation, until get the initial values of phase calibration weight for all of the transmission links.

After getting the initial value of gain calibration weight and initial value of phase calibration weight for all of the transmission links, the base station begin to run normally, so the calibration weight can be calculated for the transmission link, this step is the key point for the present invention. The calculation of calibration weight includes the calculation for gain calibration weight and phase calibration weight.

Firstly, calculate the gain calibration weight for transmission link, and then calibrate the gain for transmission link.

For a smart base station, the rating transmission power of each transmission links is fixed, known power value $P_{TX}$, but due to the different transmitting gains are different for each of the transmission links, then the power of transmission signal of each transmission links may not always reach the rating power value $P_{TX}$. When calibrating the gain of the transmission link, it only need to adjust the power of transmission signal of each transmission links to rating power value $P_{TX}$, then the gain calibration of transmission link is finished.

The calculation method of gain calibration weight for the transmission link of the first embodiment shown in FIGS. 2 and 3 is same as that of the second embodiment shown in FIG. 4 and FIG. 5.

In first embodiment, Bulter matrix is adopted for beam forming apparatus. The downlink beam forming link of Bulter matrix is equivalent to a network comprising one power divider and some phase shifter, when there is only one transmission link sending signal, there are signal output from each port of Bulter matrix for each antenna unit. Suppose the signal power transmitted by this transmission link is P (dBm), then the output signal power is $(P-20\log_{10}N-P_{LOSS})$ (dBm) from each port of Bulter matrix for each antenna unit, wherein N stands for the number of array element, $P_{LOSS}$ is the link loss power of Bulter matrix.

In second embodiment, signal synthesizing apparatus is comprised of one signal synthesizer 17, plural of couplers 15 and plural of filters 16. When there is only one transmission link sending signal, suppose the signal power separated by coupler 15 from this transmission link is P (dBm), then the power of the output signal of signal synthesizing apparatus 1 is $P-P_{LOSS}$ (dBm), $P_{LOSS}$ is the link loss power of signal synthesizing apparatus 1.

Figure 6:
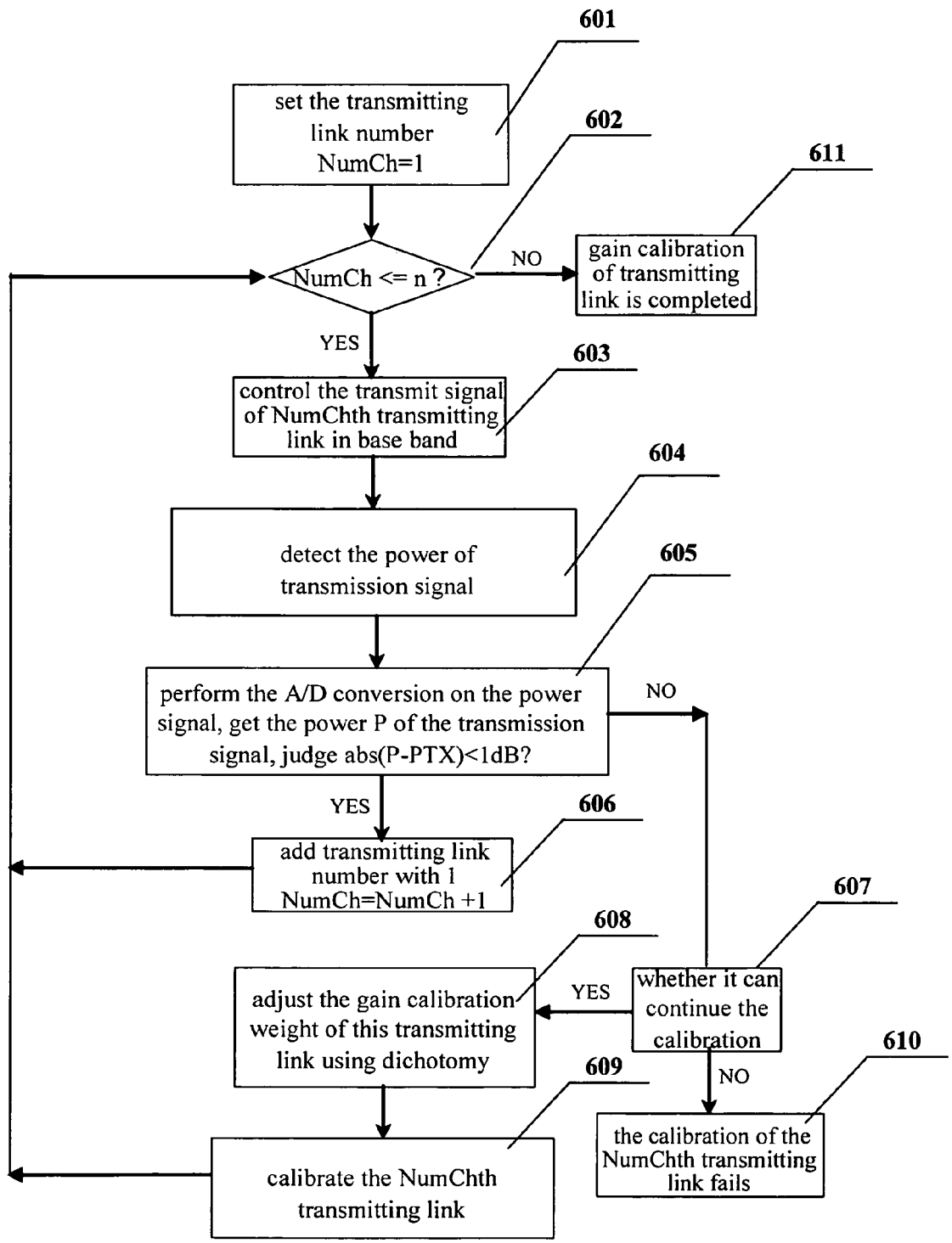
FIG. 6 is the flow chart of the gain calibration for transmission link according to the present invention.

In smart base station system, the gain calibration weight for each transmission link is fix point number which is stored in the fixed digital memory, so the value range of the gain calibration weight of transmission link is known, as well as the transmission power of each transmission link is changed only according to the transmission gain weight, so during the calibrating of transmission gain, rating transmission power $P_{TX}$ is taken as the base power value for the calibration, then adjust the transmission gain calibration weight of each transmission link using optimal algorithm, until the transmission power of each transmission link all meet the requested transmission power $P_{TX}$. In the present invention, the gain calibration weight of transmission link is a set of eight digital fixed point number, the value range is [0, 255], then the method to adjust the gain calibration weight of transmission link can use dichotomy. The specific implemental steps to adjust the gain of transmission link are shown in FIG. 6.

First, set the transmission link number NumCh=1 (step 601), judge whether the link number NumCh is larger than the transmission link number n of array antenna (step 602), if link number is larger than transmission link number n, then the gain calibration is end (step 611). If link number is less than or equal to the transmission link number n, then control the transmit signal of NumCh$^{th}$ transmission link in base band (step 603); then detect the power of transmission signal, generate power signal (step 604). Perform the A/D converting for above depicted power signal, get the power P of transmission signal, as well as judge whether the absolute value of the difference between this power P and rating power $P_{TX}$ is less than permitted error, such as 1 dB (step 605), if it is less than permitted error, then add current transmission link number with 1 (step 606), then loop back to step 602; if the absolute value of the difference is larger or equal to permitted error, then judge whether it can continue the calibration (step 607), it can be done by below methods: judge whether the iterative number of dichotomy exceeds the setting number, if it exceeds then assume that it can not continue the calibration; if it does not exceed the setting number, so further judge gain calibration weight is at maximum or the weight values for the contiguous twice dichotomy are same, if gain calibration weight is at maximum or the weight values for the contiguous twice dichotomy are same, then it assumes that the calibration can not be continued. After performing step 607, if the calibration can be continued, then adjust the gain calibration weight of this transmission link using dichotomy (step 608), then calibrate the NumCh$^{th}$ transmission link according to the updated gain calibration weight, then loop back to step 602. If it can not continue the calibration, then prompt the failure of the calibration of the NumCh$^{th}$ transmission link (step 610), and end the gain calibration of transmission link.

After calibrating the gain weight of transmission link, calculate the phase calibration weight of transmission link, and calibrate the phase of transmission link. For the case that the downlink beam is formed using different manner, there is little difference in the calibration method of transmission link.

In the first embodiment shown in FIGS. 2 and 3, the forming of the downlink beam uses Bulter matrix to form the beam.

Through the theoretical calculation or actual measurement, the weight coefficient of transmission signal from Bulter matrix can be gotten. According to the theoretical calculation, it is known that the equivalent weight coefficient matrix of the transmission link for Bulter matrix is a unitary matrix, marked as $W_{but}$, the conjugate transpose matrix of this unitary matrix is $W_{but}^H$, there is $W_{but}W_{but}^H=E$ according to the property of the unitary matrix. If it is the equivalent weight coefficient matrix of transmission link for the actually measured Bulter matrix, then due to the self error of Bulter matrix, its equivalent weight coefficient matrix is not a unitary matrix, but $W_{but}W_{but}^{-1}=E$ is tenable, E is the unit matrix.

Suppose the non-uniform error of the altitude of each transmission link is very small, same as the phase non-uniform error, it makes the effect of beam forming due to the altitude non-uniform error and phase non-uniform error can be omitted, then choose any one of the line vector $V_{bulter,i}=\{\phi_{i,1} \phi_{i,2} \ldots \phi_{i,n}\}$ from one of the conjugate matrix $W_{but}^H$ or inverse matrix $W_{but}^{-1}$ of the equivalent weight coefficient matrix as a set of beam weight, when the altitude and phase specialties of base band signal for each transmission link are all same, weight each channel's signal using this set of beam weight, then transmit it to Bulter matrix for RF beam forming, thereby the expected effect of beam forming is: there is output at only one channel antenna unit port of the antenna unit ports of Bulter matrix, while there is not signal output at the other antenna unit ports.

But for the actual array transmission link, due to the effect of the non-uniform gain and non-uniform phase of each links, when signal formed by above beam passes through the array transmission link, it equals that the beam is weighted again by the transmission link, and this kind of weight for altitude and phase is different for each transmission links, although the signal is beam formed again through Bulter matrix, but the above expected effect can not exist.

During the phase calibration of transmission link, take the beam weight $V_{bulter,i}=\{\phi_{i,1} \phi_{i,2} \ldots \phi_{i,n}\}$ of theoretical calculation as the initial value of phase calibration weight for transmission link, wherein $i \leq n$, after the gain and phase of array transmission link have been calibrated, beam weight $V_{bulter,i}=\{\phi_{i,1} \phi_{i,2} \ldots \phi_{i,n}\}$ can make it that the signal output only at the $i^{th}$ antenna unit port after the Bulter beam forming, while there are no signal output at the other antenna unit port. In the course of phase calibration of transmission link, this set of beam weight is adjusted continuously, until the signal after Bulter matrix beam forming only has signal output at the $i^{th}$ antenna unit port, and there is no signal output at the other antenna unit port, at that time the beam weight of the transmission link is marked as $\{w_1 w_2 \ldots w_n\}$, then the final phase calibration weight of transmission link is $$W_{PHASE} = \left\{ \frac{w_1}{\phi_{i,1}} \quad \frac{w_2}{\phi_{i,2}} \quad \ldots \quad \frac{w_n}{\phi_{i,n}} \right\}.$$

Figure 7:
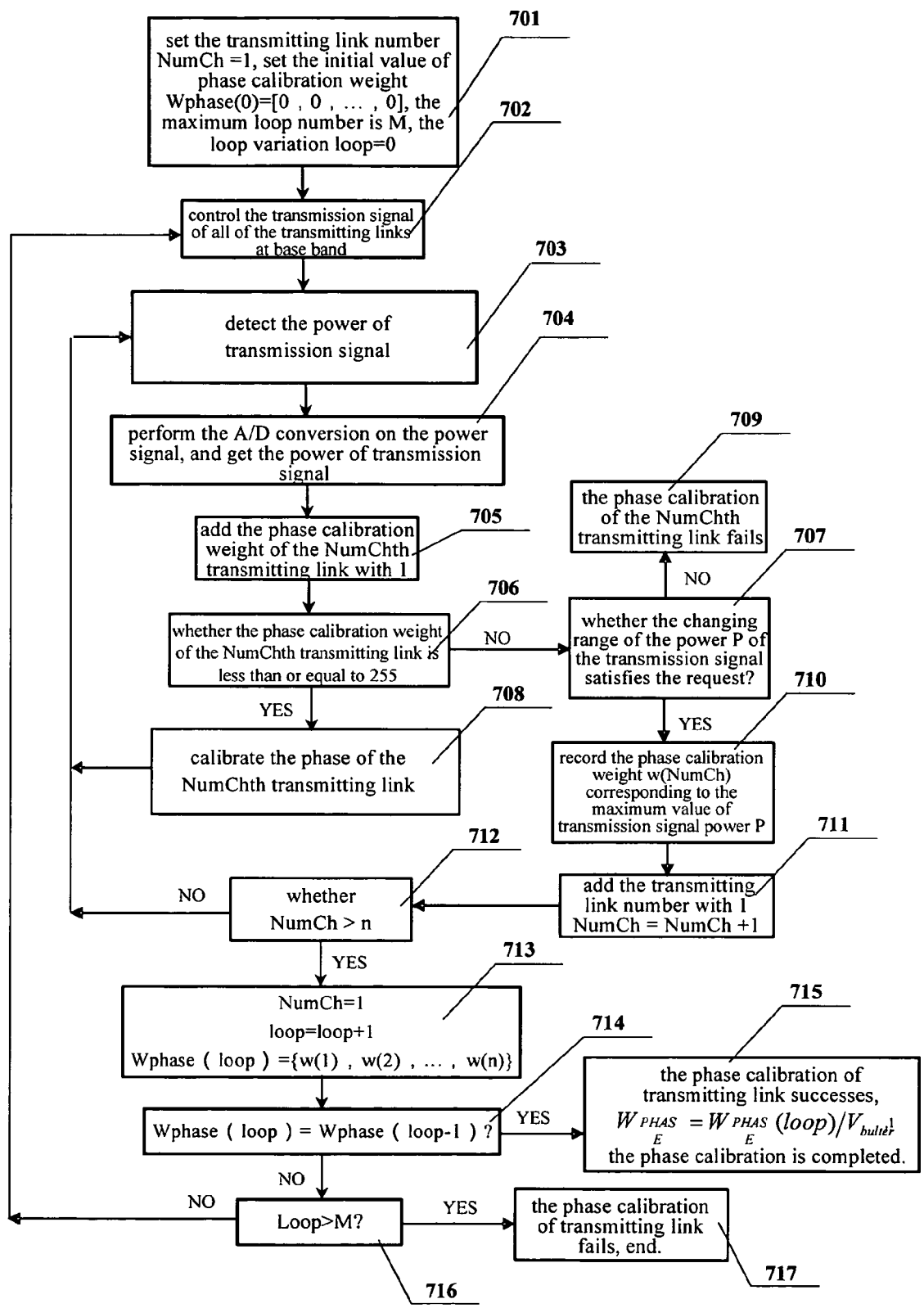
FIG. 7 is the flow chart of the phase calibration for transmission link suitable for the calibration apparatus illustrated in the first embodiment.

In the present invention, the chosen phase calibration weight of transmission link is a set of eight digital fixed point number, the value range is [0, 255], it is use direct searching method to calculate the phase calibration weight. The specific implemental steps to calibrate the phase of transmission link are shown in FIG. 7.

Firstly, set the parameters, there are n of transmission links of array antenna, set the transmission link number NumCh=1, set the initial value of phase calibration weight Wphase(0)= [0, 0, . . . , 0], the maximum loop number is M, the loop variation loop's initial value is 0 (step 701). Control the transmission signal of all of the transmission link at base band (step 702), detect the power of transmission signal, form the power signal (step 703), then perform the A/D converting for above depicted power signal, and get the power P of transmission signal, save this power value (step 704). Add the phase calibration weight of the NumCh$^{th}$ transmission link with 1 (step 705), judge whether the phase calibration weight of the NumCh$^{th}$ transmission link exceeds the value range of phase calibration weight (step 706), such as 255. If it does not exceed the value range, then calibrate the phase of the NumCh$^{th}$ transmission link (step 708), and loop back to step 703. If it exceeds the value range, then judge whether the variation range of the power of the transmission signal P meets the request (step 707), if it does not meet, then prompt the failure of the phase calibration of the NumCh$^{th}$ transmission link (step 709), end the course of this phase calibration. If it meets the request, then record the phase calibration weight WNumCh corresponding to the maximum value of transmission signal power P (step 710), then add the transmission link number with 1, that is, NumCh=NumCh+1 (step 711), then judge whether the transmission link number exceeds n (step 712), if it does not exceed, then loop back to step 703; if it exceeds, then set transmission link number as 1, add the loop variation with 1, that is, loop=loop+1, phase calibration weight Wphase(loop)=[w(1), w(2), . . . , w(n)], which is WNumCh (step 713). Judge whether the current calibration weight Wphase(loop) is same as the calibration weight Wphase(loop−1) of last time (step 714), if they are same, then it means the phase calibration of transmission link successes, modify the calculated phase calibration weight using the first line vector $V_{bulter,1}$ of the unitary matrix $W_{but}^H$ or the inverse matrix $W_{but}^{-1}$ of the transmission link's equivalent weight coefficient matrix for Bulter matrix, that is, $W_{PHASE}=W_{PHASE}$(loop)/$V_{bulter,1}$, the phase calibration is end (step 715). If they are not same, then judge whether the loop variation loop is larger than the maximum loop number M (step 716), if it is true, then prompt the failure of phase calibration of transmission link, the phase calibration is end (step 717), otherwise loop back to step 703. After the phase calibration successes, use the new phase calibration weight to replace the initial value of phase calibration weight.

The second embodiment shown in FIG. 4 and FIG. 5, the downlink beam forming is realized in the base band of base station. The phase calibration method of transmission link of this embodiment is described below.

Take any one of the transmission link of array antenna as a benchmark, then adjust the phase of other transmission links using algorithm, make the phase of other transmission links is same as that of this benchmark link. The guard line to judge whether the phase are same is the power of output signal reaches maximum.

After the transmitting gain of the transmission link for the smart base station has been calibrated, the impulsion response specialty of the transmission link for the smart base station can be described as $A'=[ae^{j\phi_1} ae^{j\phi_2} \ldots ae^{j\phi_n}]^T$, wherein a stands for the altitude (gain) of the transmission link, $\phi_n$ stands for the phase of the $n^{th}$ transmission link, T stands for transpose operation. Suppose the phase calibration weight of transmission link is $W_{PHASE}=[1 \ e^{j\beta_2} \ \ldots \ e^{j\beta_n}]^T$, then the impulsion response specialty of transmission link after the phase calibration can be described as $A = W_{PHASE} \cdot A'[ae^{j\Phi_1} \ ae^{j(\Phi_2+\beta_2)} \ldots ae^{j(\Phi_n+\beta_n)}]^T$, wherein $\beta_n$ stands for the phase of phase calibration weight.

When the downlink base band signal is s, the downlink beam forming weight can be set as a unit matrix of n X n then the output of array antenna is $X = e_n \cdot A \cdot s + n = A \cdot s + n$.

Suppose each of the antenna unit forms the array in a linear manner, then the synthesized signal of this set of beam weight in the direction which is perpendicular to the plane of the antenna array can be expressed as $S = ase^{j\Phi_1} \times (1 + e^{j(\Phi_2-\Phi_1+\beta_2)} + \ldots e^{j(\Phi_n-\Phi_1+\beta_n)})$, then it can be seen that $|1 + e^{j(\Phi_2-\Phi_1+\beta_n)}| \leq n$, so the synthesized signal S has the maximum value, which is $|S| = nas$, at this time, $\beta_2 = \phi_1 - \phi_2, \ldots, \beta_n = \phi_1 - \phi_n$.

So through the adjustment of the values of $\beta_2, \ldots, \beta_n$, the synthesized signal has the maximum intensity can be gotten, the intensity of the synthesized signal is at maximum, the corresponding vector $W_{PHASE} = [1 \ e^{j\beta_2} \ \ldots \ e^{j\beta_n}]^T = [1 \ e^{j(\Phi_1-\Phi_2)} \ldots e^{j(\Phi_1-\Phi_n)}]^T$ is the calibration weight of the transmission link for the array antenna. Then the impulsion response specialty of transmission link after the calibration can be described as $A = W_{PHASE} \cdot A' = [ae^{j\Phi_1} \ ae^{j(\Phi_2+\Phi_1-\Phi_2)} \ldots ae^{j(\Phi_n+\Phi_1-\Phi_n)}]^T = [ae^{j\Phi_1} \ ae^{j\Phi_1} \ldots ae^{j\Phi_1}]^T$, it can be seen from the above equation, the phase specialty of each transmission link after calibration has been same.

Figure 8:
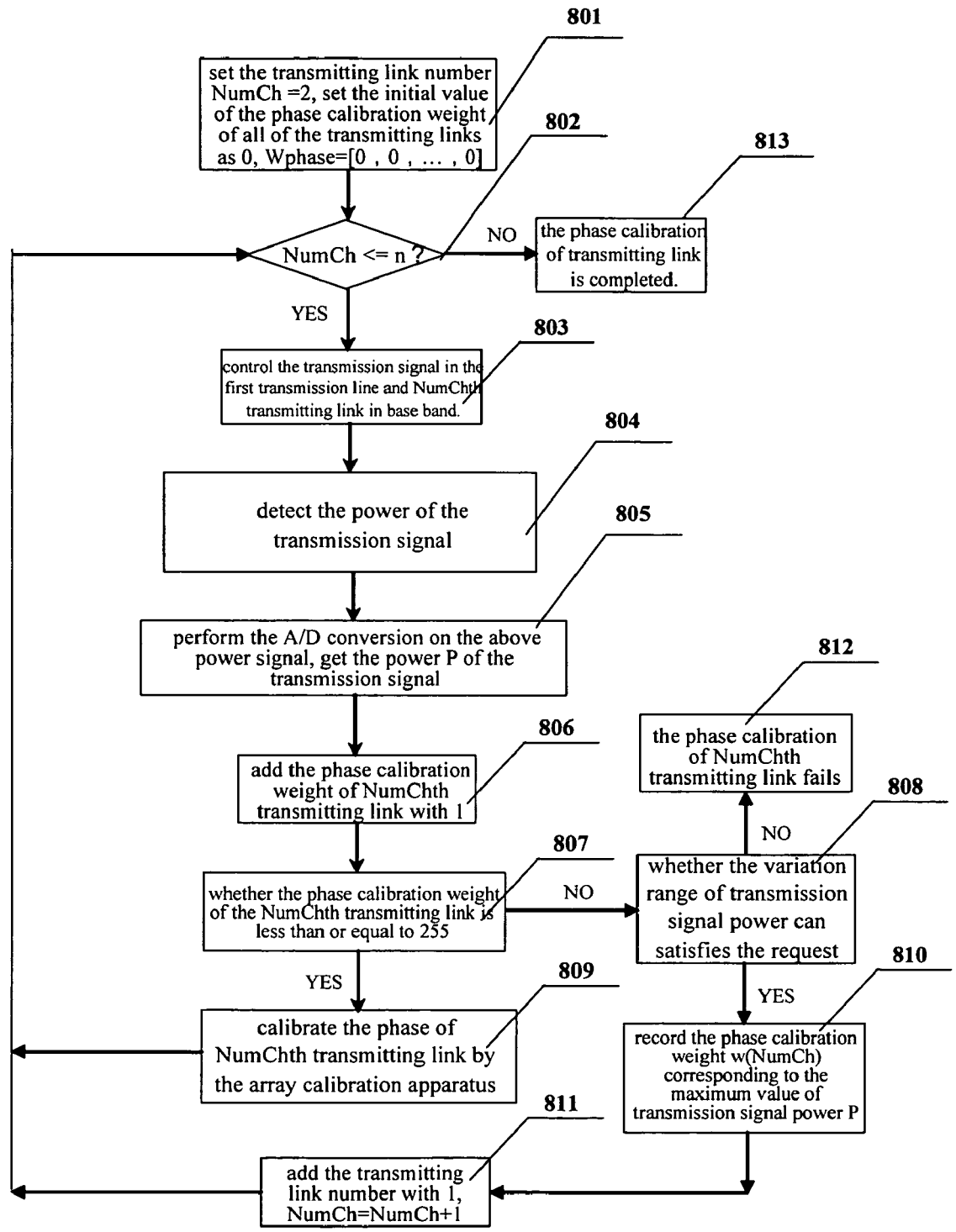
FIG. 8 is the flow chart of the phase calibration for transmission link suitable for the calibration apparatus illustrated in the second embodiment.

Hereinafter, the method for calculating the phase calibration weight of transmission link is given out, during the adjustment of the value of $\beta_2, \ldots, \beta_n$, suppose $J = |nas - p(n)|$ is the target function, wherein $p(n)$ is the power value of the synthesized signal, take $\beta_2, \ldots, \beta_n$ as the variation, use the optimal algorithm to calculate the optimal phase calibration weight. It can be seen that this is an unconstrained nonlinear programming problem of (n−1) dimensions, there are many methods to calculate the transmission phase calibration weight, such as improved simplicity algorithm and other optimal algorithm all have fast speed of convergence and the fine accuracy of convergence. In the smart base station system, transmission phase calibration weight is fixed point number which is stored by fixed digital memory as well, so the transmission phase calibration weight has the fixed value range. The phase calibration weight of transmission link in the present invention is a set of eight digital fixed point number, the value range is [0, 255], it is use direct searching method to calculate the phase calibration weight. The specific implemental steps are shown in FIG. 8.

Firstly, set the transmission link number NumCh=2, set the initial value of the phase calibration weight of all of the transmission links as 0, that is Wphase=[0, 0, . . . , 0] (step 801). Judge whether the transmission link number NumCh is less than or equal to the transmission link number n in the array (step 802), if it is larger than n, then this phase calibration of transmission link is end; if it is less than or equal to n, then control the transmission signal in first transmission line and NumCh$^{th}$ transmission link in base band (step 803). Detect the power of transmission signal, form the power signal (step 804), then perform the A/D conversion for above power signal, get the power P of the transmission signal, and store this power value (step 805). Add the phase calibration weight of NumCh$^{th}$ transmission link with 1 (step 806), judge whether the phase calibration weight of NumCh$^{th}$ transmission link is less than or equal to the value range of phase calibration weight (step 807), such as 255, if it is less than or equal to value range, then calibrate the phase of NumCh$^{th}$ transmission link (step 809), then loop back step 802. If it is larger than value range, then judge whether the variation range of transmission signal power P can meet the request (step 808), if it can not meet the request, then prompt the failure of the phase calibration of NumCh$^{th}$ transmission link (step 812); if it meets the request, then record the phase calibration weight corresponding to the maximum value of transmission signal power P (step 810), then add the transmission link number with 1, that is NumCh=NumCh+1, then loop back to step 802. After the phase calibration successes, use the new phase calibration weight to replace the initial value of phase calibration weight.

For the gain calibration and phase calibration of transmission link, according to the idea of the present invention, it can be finished using other optimal algorithm without departing the spirit of the present invention.

It should be understand that above embodiments are used only for the explanation of the present invention and they are not to restrict the present invention. While the present invention has been shown and described in connection with the preferred embodiments, it will be apparent to those skilled in the art that modifications and variations can be made without departing from the spirit and scope of the invention as defined by the appended claims.

What is claimed is:

1. A calibration apparatus for array antenna transmission links, where each transmission link comprises an array transmitter, n power amplifiers, n uplink and downlink signal separating apparatuses, and n antenna units, the array transmitter, the n power amplifiers and the n uplink and downlink signal separating apparatuses are placed in a base station, an output of a base band signal processing module is inputted into the array transmitter, n channels of signal are transmitted by the array transmitter, after going through the power amplifiers and uplink and downlink signal separating apparatuses, the n channels of signal are transmitted through the antenna units, the calibration apparatus comprising:
   a power detecting signal separating apparatus,
   a power detecting signal feeder apparatus,
   a power detecting apparatus,
   a signal synthesizing apparatus, and
   an array calibration apparatus;
   wherein
   the power detecting signal separating apparatus receives an RF signal from the uplink and downlink signal separating apparatuses, filters out a DC signal from the RF signal, and transmits a filtered RF signal of high frequency to the power detecting signal feeder apparatus;
   the power detecting signal feeder apparatus is configured to transmit the high frequency RF signal outputted by the power detecting signal separating apparatus;
   the signal synthesizing apparatus coupled with the n antenna units is configured to synthesize the filtered high frequency RF signal from the power detecting signal feeder apparatus and output the synthesized RF signal to the power detecting apparatus;
   the power detecting apparatus is configured to detect a power of a synthesized RF signal coming from the signal synthesizing apparatus, and output a feedback power signal to the power detecting signal feeder apparatus;
   the power detecting signal feeder apparatus is further configured to mix the feedback power signal outputted by the power detecting apparatus and the filtered high frequency RF signal, and transmit a mixed signal to the power detecting signal separating apparatus;
   the power detecting signal separating apparatus is further configured to recover the feedback power signal from the mixed signal from the power detecting signal feeder apparatus, adjust a calibration weight, and transmit an adjusted calibration weight to the array calibration apparatus;

the array calibration apparatus placed between the base band signal processing module and the array transmitter is configured to calibrate the array antenna transmission links according to the adjusted calibration weight.

2. The calibration apparatus of array antenna transmission links according to claim 1, wherein the signal synthesizing apparatus, the signal power detecting apparatus, and the power detecting signal feeder apparatus can form an outdoor unit with the n antenna units, the outdoor unit is connected with the base station via RF cables.

3. The calibration apparatus of array antenna transmission links according to claim 1, wherein the signal synthesizing apparatus includes a Bulter matrix, (n−1) couplers, (n−1) filters and (n−1) adjustable attenuators, wherein the couplers, the filters and the adjustable attenuators are provided in first (n−1) transmission links the coupler is configured to separate a small part of the RF signal from an RF beam signal formed according to the Bulter matrix; the separated RF signal is filtered by the filters and attenuated by the adjustable attenuators, then sent to the signal power detecting apparatus.

4. The calibration apparatus of array antenna transmission links according to claim 3, wherein an attenuation of a source RF signal caused by the separated RF signal does not exceed 1 dB.

5. The calibration apparatus of array antenna transmission links according to claim 3, wherein the signal power detecting apparatus is comprised of (n−1) detectors and (n−1) amplifiers, corresponding to the first (n−1) transmission links; an RF signal of the first (n−1) transmission links form a feedback power signal after processed by the detectors and the amplifiers, the feedback power signal is outputted to the power detecting signal feeder apparatus.

6. The calibration apparatus of array antenna transmission links according to claim 3, wherein the power detecting signal feeder apparatus includes n signal feeder units, corresponding to n transmission links, respectively, each of the signal feeder units includes: an inductive circuit L, a capacity circuit C1 and a capacity circuit C2;

when for signal feeder units of a first transmission link to an $(n-1)^{th}$ transmission link, wherein the inductive circuit L is configured to mix a low frequency signal of a feedback power signal with a high frequency RF signal, the capacity circuit C2 is configured to filter a high frequency part of the feedback power signal, the capacity circuit C1 is configured to prevent sending the low frequency signal of a power detecting signal to the antenna units; and when the inductive circuit L in an $n^{th}$ transmission link is configured to separate a power supply signal from a high frequency RF signal, the capacity circuit C2 is configured to filter a high frequency part of the power supply signal, the capacity circuit C1 is configured to prevent sending the power supply signal to the antenna units.

7. The calibration apparatus of array antenna transmission links according to claim 3, wherein the power detecting signal separating apparatus includes n inductive circuits L, n capacity circuits C3, n capacity circuits C4, (n−1) A/D converters and a calibration weight calculating apparatus, wherein an $n^{th}$ transmission link does not have an A/D converter;

when for each of a first to an $(n-1)^{th}$ transmission links, an inductive circuit L is configured to separate a feedback power signal from a mixed signal; the capacity circuit C4 is configured to filter a high frequency part of the feedback power signal; a capacity circuit C3 is configured to prevent sending the feedback power signal to the uplink and downlink signal separating apparatus of a corresponding transmission link;

when for an $n^{th}$ transmission link, an inductive circuit L is configured to mix a power supply signal with a high frequency RF signal; a capacity circuit C4 is configured to filter a high frequency part of the power supply signal; a capacity circuit C3 is configured to prevent sending the power supply signal to an $n^{th}$ uplink and downlink signal separating apparatus;

the A/D converter is configured to perform A/D converting for a low frequency feedback power signal, and transmit a converted signal to the calibration weight calculating apparatus; and the calibration weight calculating apparatus is configured to adjust a calibration weight according to a value of a received feedback power signal.

8. The calibration apparatus of array antenna transmission links according to claim 1, wherein the signal synthesizing apparatus is comprised of n couplers, n filters and one signal synthesizer with n channels; the coupler is configured to separate a small part of an RF signal from a high frequency RF signal outputted by the power detecting signal feeder apparatus; the separated RF signal is sent to the synthesizer after processed by the filters, then a synthesized RF signal is outputted to the power detecting apparatus.

9. The calibration apparatus of array antenna transmission links according to claim 8, wherein the power detecting apparatus is comprised of a detector and an amplifier; a synthesized RF signal forms a feedback power signal through processing of the detector and the amplifier, and is sent to the power detecting signal feeder apparatus.

10. The calibration apparatus of array antenna transmission links according to claim 8, wherein the power detecting signal feeder apparatus includes an inductive circuit L, a capacity circuit C1 and a capacity circuit C2 in any one of first (n−1) transmission links and an $n^{th}$ transmission link; wherein the inductive circuit L in any one of the first (n−1) transmission links is configured to mix a low frequency signal of a feedback power signal with a high frequency RF signal, the mixed signal is transmitted to a power detecting signal separating apparatus in the base station; the apparatus capacity circuit C2 is configured to filter a high frequency part of the feedback power signal; the capacity circuit C1 is configured to prevent sending the low frequency signal in the feedback power signal to the antenna units; and the inductive circuit L of the $n^{th}$ transmission link is configured to separate a power supply signal from a high frequency RF signal; the capacity circuit C2 is configured to filter a high frequency part of the power supply signal; the capacity circuit C1 is configured to prevent sending the power supply signal to the antenna units.

11. The calibration apparatus of array antenna transmission links according to claim 8, wherein the power detecting signal separating apparatus includes an inductive circuit L, a capacity circuit C3 and a capacity circuit C4 in any one transmission link which is chosen in a corresponding power detecting signal feeder apparatus and an $n^{th}$ transmission link, the power detecting signal separating apparatus further includes an A/D converter and a calibration weight calculation apparatus; wherein the inductive circuit L of the any one transmission link is configured to separate a feedback power signal from a mixed signal, the capacity circuit C4 is configured to filter a high frequency part of the feedback power signal, the capacity circuit C3 is configured to prevent sending the feedback power signal to a first uplink and downlink signal separating apparatus;

when the inductive circuit L of the $n^{th}$ transmission link is configured to mix a power supply signal with a high frequency RF signal; the capacity circuit C4 is configured to filter a high frequency part of the power supply signal; the capacity circuit C3 is configured to prevent sending the power supply signal to an $n^{th}$ uplink and downlink signal separating apparatus;

the A/D converter is configured to perform A/D converting for a low frequency feedback power signal, and transmit the converted low frequency feedback power signal to the calibration weight calculating apparatus; and the calibration weight calculating apparatus is configured to adjust calibration weight according to a value of a received feedback power signal.

12. A calibration method of array antenna transmission links comprising:

first, obtaining initial values of gain calibration weight and phase calibration weight of a transmission link;

then calculating the gain calibration weight and the phase calibration weight of the transmission link; and calibrating a gain and a phase of an array transmission link using a calculated calibration weight, wherein obtaining initial values of phase calibration weight of a transmission link further comprises: firstly, controlling at a base band each transmission link to send signal with a same phase;

then selecting a first transmission link as a reference channel, other channels as channels to be calibrated;

adjusting a phase of a transmission signal on the channels to be calibrated such that a signal power of a first antenna unit is at maximum and signal powers of other antenna units are at minimum;

saving a phase adjusting coefficient of transmission link at this time, which is represented by a vector $[0\phi_{adj1} \cdots \phi_{adjn}]$;

then calculating an inverse matrix $W_{but}{}^H$ or $W_{but}{}^{-1}$ of an equivalent transmission coefficient matrix of a Bulter matrix; and choosing a first line vector of the inverse matrix, respected by $V_{bulter,1} = [\phi_{1,1} \phi_{1,2} \cdots \phi_{1,n}]$, wherein the initial value of the phase calibration weight for the transmission link is $$\begin{bmatrix} \frac{0}{\phi_{1,1}} & \frac{\phi_{adj2}}{\phi_{1,2}} & \cdots & \frac{\phi_{adjn}}{\phi_{1,n}} \end{bmatrix}.$$

13. The calibration method of array antenna transmission links according to claim 12, wherein obtaining initial values of gain calibration weight and phase calibration weight of a transmission link further comprises:

controlling a base band signal to make a base station only having one channel of link transmission signal;

adjusting the gain calibration weight for the transmission link such that a transmission power of the transmission link reaches a rated value, the gain calibration weight at this time is the initial value of the gain calibration weight for the transmission link; and performing the above operation for all of transmission links in the base station, to get an initial value of gain calibration weight for each transmission link.

14. The calibration method of array antenna transmission links according to claim 12, wherein calculating the gain calibration weight and the phase calibration weight of the transmission link further comprises:

taking a rated transmission power as a base power value for calibration;

then using a dichotomy method to calculate the gain calibration weight of the transmission link; and adjusting the gain of the transmission link according to the calculated gain calibration weight, until the transmission power of the transmission link meets a requested transmission power.

15. The calibration method of array antenna transmission links according to claim 14, wherein calculating the gain calibration weight and the phase calibration weight of the transmission link, further comprises:

step 1) setting a transmission link number NumCh=1;

step 2) judging whether the link number NumCh is larger than a number of transmission links of an array antenna, if the link number NumCh is larger than the number of the transmission links, then ending a gain calibration;

step 3) if the link number NumCh is less than or equal to the number of the transmission links, then controlling at a base band a transmission signal of a $NumCh^{th}$ transmission link;

step 4) detecting a power of a transmission signal to generate a feedback power signal;

step 5) performing an A/D converting for the feedback power signal, obtaining a power of the transmission signal;

step 6) judging whether an absolute value of a difference between the power obtained in step 5) and a rated power is less than a permitted error, if the difference is less than the permitted error, then adding 1 to the transmission link number NumCh, and jumping back to step 2);

step 7) if the absolute value of the difference is larger or equal to the permitted error, then judging whether the calibration can be continued, if the calibration can be continued, then using a dichotomy method to adjust the gain calibration weight of the transmission link, then calibrating the $NumCh^{th}$ transmission link according to an updated gain calibration weight, then jumping back to step 2); and step 8) if the calibration cannot be continued, then prompting a failure of the gain calibration of the $NumCh^{th}$ transmission link, and ending the gain calibration of the transmission link, wherein step 7) further comprises: judging whether an iterative number of the dichotomy method exceeds a predetermined number, if the iterative number exceeds the predetermined number, then assuming that the calibration cannot be continued; if the iterative number does not exceed the predetermined number, further judging whether the gain calibration weight is at maximum or whether iterative weight values for a contiguous twice dichotomy method are same, if the gain calibration weight is at maximum or the weight values for the contiguous twice dichotomy are the same, then assuming that the calibration cannot be continued.

16. The calibration method of array antenna transmission links according to claim 12, wherein obtaining initial values of gain calibration weight and phase calibration weight of a transmission link further comprises:

choosing any line vector $V_{bulter,1} = \{\phi_{1,1} \phi_{1,2} \cdots \phi_{i,n}\}$ from a conjugate matrix or an inverse matrix of the equivalent weight coefficient matrix of the transmission link of the Bulter matrix as a set of beam weights to weigh each channel of signal;

then using the Bulter matrix for RF beam forming; and using a direct searching method to adjust the set of beam weights continuously, until a signal only has a signal is only outputted at an $i^{th}$ antenna unit port after Bulter matrix beam forming, and no signal is outputted at other antenna unit ports, at that time a beam weight of the transmission link is marked as $\{W_1 \ W_2 \ldots W_n\}$, then a final phase calibration weight of the transmission link is $$W_{PHASE} = \left\{ \frac{w_1}{\phi_{i,1}} \ \frac{w_2}{\phi_{i,2}} \ \ldots \ \frac{w_n}{\phi_{i,n}} \right\}.$$

17. The calibration method of array antenna transmission links according to claim 16, wherein obtaining initial values of gain calibration weight and phase calibration weight of a transmission link further comprises:

step 1) setting a transmission link number NumCh=1, setting an initial value of a phase calibration weight Wphase(0)=[0, 0, . . . , 0], a maximum loop number is M, an initial value of a loop variation loop is 0;

step 2) controlling the transmission signal of the transmission link at the base band;

step 3) detecting a power of the transmission signal, form a feedback power signal;

step 4) performing an A/D conversion for the feedback power signal, and obtaining the power of the transmission signal, saving a power value;

step 5) adding 1 to a phase calibration weight of a NumCh$^{th}$ transmission link, judging whether the phase calibration weight of the NumCh$^{th}$ transmission link exceeds a value range of phase calibration weight; if the phase calibration weight of the NumCh$^{th}$ transmission link does not exceed the value range, then calibrating the phase of the NumCh$^{th}$ transmission link, and jumping back to step 3);

step 6) if the phase calibration weight of the NumCh$^{th}$ transmission link exceeds the value range, then judging whether a variation range of the power of the transmission signal meets a request, if the variation range does not meet the request, then prompting a failure of a phase calibration of the NumCh$^{th}$ transmission link;

step 7) if the variation range meets the request, then recording a phase calibration weight corresponding to a maximum value of the power of the transmission signal, adding 1 to the transmission link number NumCh, then judging whether the transmission link number NumCh exceeds a number of transmission links of an array antenna, if the transmission link number NumCh does not exceed the number of the transmission links of the array antenna, then jumping back to step 3);

step 8) if the transmission link number NumCh exceeds the number of the transmission links of the array antenna, then setting the transmission link number NumCh as 1, adding 1 to a loop variation, the phase calibration weight Wphase (loop)=[w(1), w(2), . . . , w(n)] is a phase calibration weight corresponding to the maximum value of the power of the transmission signal;

step 9) judging whether a current phase calibration weight Wphase(loop) is same as a calibration weight Wphase (loop−1) of last time, if they are the same, then assuming that the phase calibration of the transmission link is successful, modifying the calculated phase calibration weight using a first line vector $V_{bulter,1}$ of the inverse matrix of the equivalent weight coefficient matrix of the transmission link of the Bulter matrix, that is, $W_{PHASE}=W_{PHASE}(loop)/V_{bulter,1}$, ending the phase calibration; and step 10) if they are not the same, then judging whether the loop variation loop is larger than the maximum loop number M, if the loop variation loop is larger than the maximum loop number M, then prompting a of the phase calibration of the transmission link, ending the phase calibration, otherwise jumping back to step 3).

18. A calibration method of array antenna transmission links, comprising:

first, obtaining initial values of gain calibration weight and phase calibration weight of a transmission link;

then calculating the gain calibration weight and the phase calibration weight of the transmission link; and calibrating a gain and a phase of an array transmission link using a calculated calibration weight, wherein obtaining initial values of phase calibration weight of a transmission link further comprises:

firstly, choosing a transmission link as the reference channel, the other transmission links as the channel to be calibrated;

controlling the reference channel and one of the channels to be calibrated to transmit signal simultaneously;

adjusting a phase of a base band signal in the one channel to be calibrated to make a power of a synthesized signal of signals transmitted by the reference channel and the one channel to be calibrated at minimum, wherein a conjugate of a phase adjusting coefficient for the one channel to be calibrated is the initial value of the phase calibration weight for this channel; and choosing another channel to be calibrated, repeating the depicted operation until obtaining initial values of phase calibration weight for each transmission link.

19. The calibration method of array antenna transmission links according to claim 18, wherein obtaining initial values of gain calibration weight and phase calibration weight of a transmission link further comprises:

taking any one of transmission links of an array antenna as a benchmark; and then adjusting a phase of other transmission links using algorithm to make an intensity of the synthesized signal reach maximum, then a corresponding vector $W_{PHASE}=[1 \ e^{j\beta_2} \ldots e^{j\beta_n}]^T=[1 \ e^{j(\Phi_1-\Phi_2)} \ldots e^{j(\Phi_1-\Phi_n)}]^T$ is the phase calibration weight of the transmission link of an array antenna, wherein $\phi_n$ stands for a phase of an $n^{th}$ transmission link, T stands for transpose operation.

20. The calibration method of array antenna transmission links according to claim 19, wherein obtaining initial values of gain calibration weight and phase calibration weight of a transmission link further comprises:

step 1) setting a transmission link number NuniCh=2, setting an initial value of a phase calibration weight of each of all transmission links as 0, that is Wphase=[0, 0, . . . 0];

step 2) judging whether the transmission link number NumCh is less than or equal to a number of transmission links in the array, if the transmission link number NumChis larger than the number of the transmission links, then ending the phase calibration of the transmission link;

step 3) if the transmission link number NumCh is less than or equal to the number of the transmission links, then controlling a transmission signal of a first transmission link and a NumCh$^{th}$ transmission link at a base band;

step 4) detecting a power of the transmission signal to form a feedback power signal;

step 5) performing an A/D conversion for the feedback power signal, obtaining the power of the transmission signal, and storing a power value;

step 6) adding 1 to a phase calibration weight of the NumCh$^{th}$ transmission link, judging whether the phase calibration weight of the NumCh$^{th}$ transmission link is less than or equal to a value range of phase calibration weight, if the phase calibration weight of the NumCh$^{th}$ transmission link is less than or equal to the value range, then calibrating a phase of the NumCh$^{th}$ transmission link, then jumping back to step 2);

step 7) if the phase calibration weight of the NumCh transmission link is larger than the value range, then judging whether a variation range of the power of the transmission signal can meet a request, if the variation range cannot meet the request, then prompting a failure of the phase calibration of the NumCh$^{th}$ transmission link;

step 8) if the phase calibration weight of the NumCh transmission link meets the request, then recording the phase calibration weight corresponding to a maximum value of the power of the transmission signal, then adding 1 to the transmission link number, jumping back to step 2).

21. The calibration method of array antenna transmission links according to claim 18, wherein obtaining initial values of gain calibration weight and phase calibration weight of a transmission link further comprises:

controlling a base band signal to make a base station only having one channel of link transmission signal;

adjusting the gain calibration weight for the transmission link such that a transmission power of the transmission link reaches a rated value, the gain calibration weight at this time is the initial value of the gain calibration weight for the transmission link; and performing the above operation for all of transmission links in the base station, to get an initial value of gain calibration weight for each transmission link.

22. The calibration method of array antenna transmission links according to claim 18, wherein calculating the gain calibration weight and the phase calibration weight of the transmission link further comprises:

taking a rated transmission power as a base power value for calibration;

then using a dichotomy method to calculate the gain calibration weight of the transmission link; and adjusting the gain of the transmission link according to the calculated gain calibration weight, until the transmission power of the transmission link meets a requested transmission power.

23. The calibration method of array antenna transmission links according to claim 22, wherein calculating the gain calibration weight and the phase calibration weight of the transmission link, further comprises:

step 1) setting a transmission link number NumCh=1;

step 2) judging whether the link number NurnCh is larger than a number of transmission links of an array antenna, if the link number NumCh is larger than the number of the transmission links, then ending a gain calibration;

step 3) if the link number NumCh is less than or equal to the number of the transmission links, then controlling at a base band a transmission signal of a NumCh$^{th}$ transmission link;

step 4) detecting a power of a transmission signal to generate a feedback power signal;

step 5) performing an A/D converting for the feedback power signal, obtaining a power of the transmission signal;

step 6) judging whether an absolute value of a difference between the power obtained in step 5) and a rated power is less than a permitted error, if the difference is less than the permitted error, then adding 1 to the transmission link number NumCh, and jumping back to step 2);

step 7) if the absolute value of the difference is larger or equal to the permitted error, then judging whether the calibration can be continued, if the calibration can be continued, then using a dichotomy method to adjust the gain calibration weight of the transmission link, then calibrating the NumCh$^{th}$ transmission link according to an updated gain calibration weight, then jumping back to step 2); and step 8) if the calibration cannot be continued, then prompting a failure of the gain calibration of the NumCh$^{th}$ transmission link, and ending the gain calibration of the transmission link, wherein step 7) further comprises: judging whether an iterative number of the dichotomy method exceeds a predetermined number, if the iterative number exceeds the predetermined number, then assuming that the calibration cannot be continued; if the iterative number does not exceed the predetermined number, further judging whether the gain calibration weight is at maximum or whether iterative weight values for a contiguous twice dichotomy method are same, if the gain calibration weight is at maximum or the weight values for the contiguous twice dichotomy are the same, then assuming that the calibration cannot be continued.

* * * * *